W. CLIFFORD.
APPARATUS FOR PUNCHING AND DELIVERING TICKETS.
APPLICATION FILED AUG. 9, 1909.

976,046.

Patented Nov. 15, 1910.
3 SHEETS—SHEET 1.

Witnesses.

Inventor.
Walter Clifford
By James L. Norris

W. CLIFFORD.
APPARATUS FOR PUNCHING AND DELIVERING TICKETS.
APPLICATION FILED AUG. 9, 1909.

976,046.

Patented Nov. 15, 1910.
3 SHEETS—SHEET 2.

Witnesses.

Inventor.
Walter Clifford
By James L. Norris
Atty.

W. CLIFFORD.
APPARATUS FOR PUNCHING AND DELIVERING TICKETS.
APPLICATION FILED AUG. 9, 1909.

976,046.

Patented Nov. 15, 1910.
3 SHEETS—SHEET 3.

Witnesses.

Inventor.
Walter Clifford
By James L. Norris.

UNITED STATES PATENT OFFICE.

WALTER CLIFFORD, OF LONDON, ENGLAND.

APPARATUS FOR PUNCHING AND DELIVERING TICKETS.

976,046.  Specification of Letters Patent. Patented Nov. 15, 1910.

Application filed August 9, 1909. Serial No. 512,046.

To all whom it may concern:

Be it known that I, WALTER CLIFFORD, a subject of the King of Great Britain and Ireland, residing at London, England, have invented new and useful Improvements in Apparatus for Punching and Delivering Tickets, of which the following is a specification.

This invention relates to an improved apparatus for punching and delivering tickets for use on motor and other omnibuses, tram-cars, steam-boats, and the like, or in theaters, concert rooms, and other places where an absolute check is required; and it consists in the combination, in one apparatus, of the following two sets of instrumentalities. The first one of these sets comprises mechanism for feeding, from a roll or web of paper, or the like, a strip to form the ticket, and mechanism for punching or perforating said tickets according to their values. The second of these sets comprises mechanism for severing the punched tickets from the roll or web, mechanism for imprinting the time of payment and date of delivery, on the severed and punched tickets, and, if desired, mechanism for consecutively numbering the tickets. There is further added mechanism for recording or registering at any moment the amount of money taken, i. e. the number of fare units paid.

Figure 1:
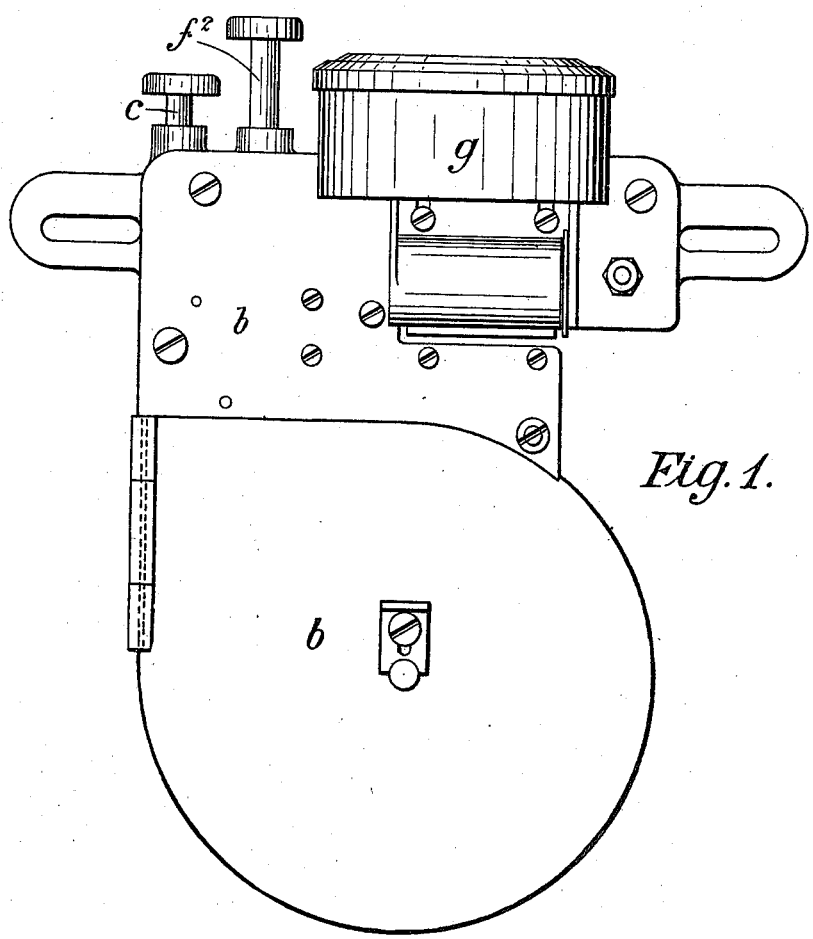
Figure 4:
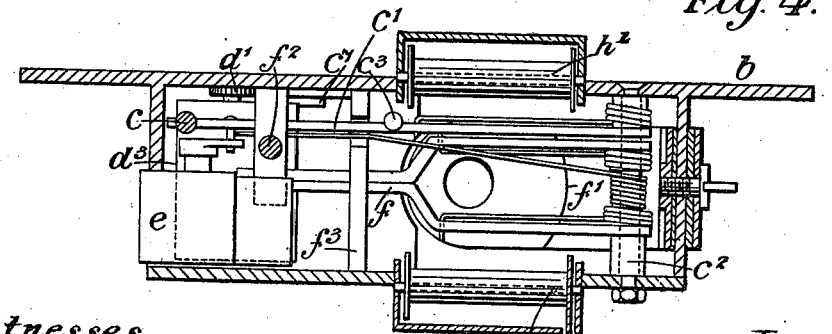
Figure 2:
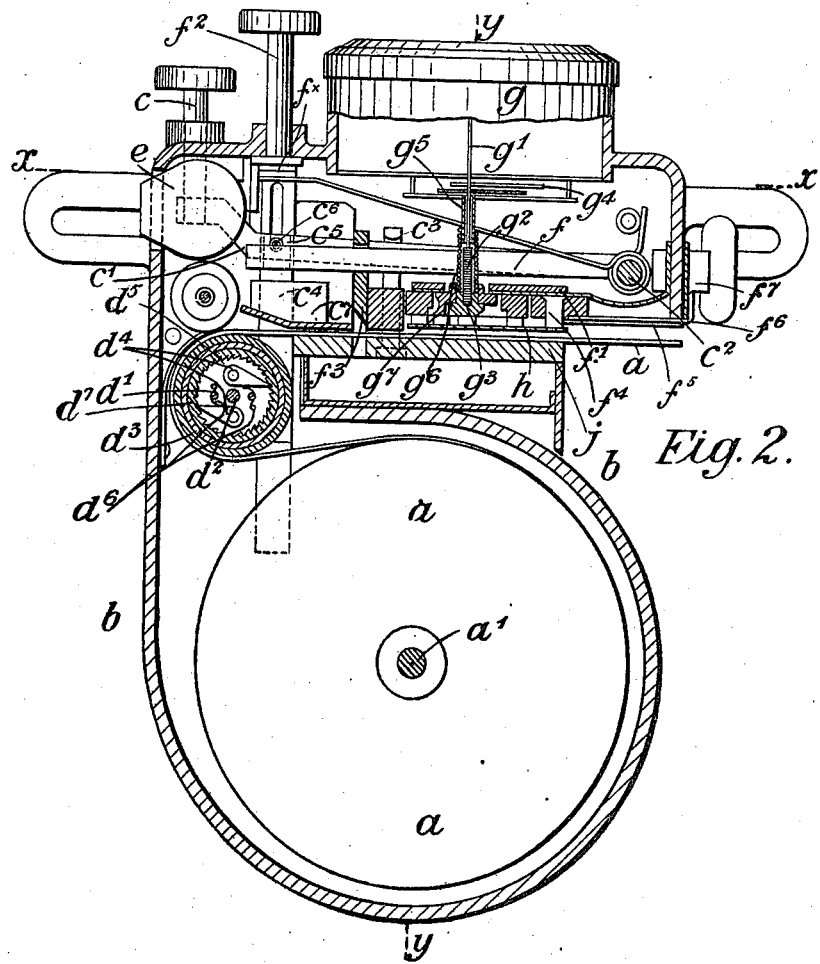
Figure 3:
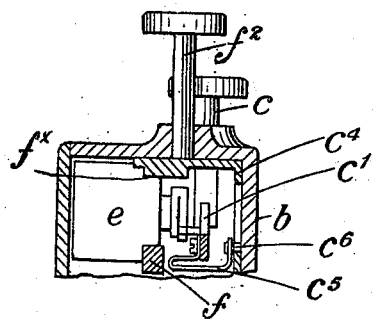
Figure 5:
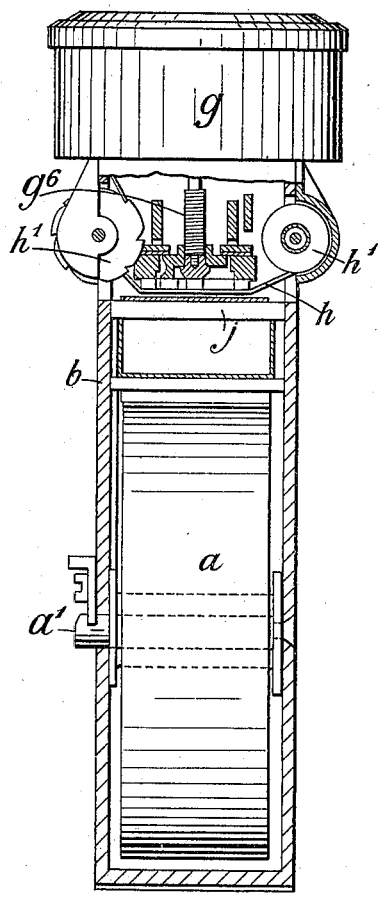
Figure 6:
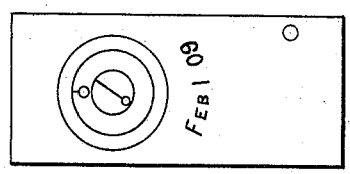
Figure 7:
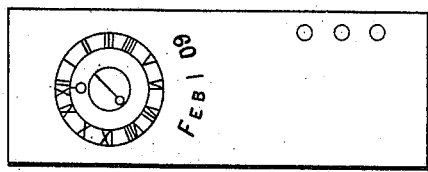

According to my invention, the price of the fare, or other payment, is ascertained by the number of perforations or holes punched in each ticket, this latter varying in length relatively to the amount of the fare units paid, and thereby obviating the necessity for the conductors or attendants to carry numerous bundles of variously colored tickets indicative of different values, as is now generally the case. And in order that my invention may be more clearly understood, I will now describe it fully with reference to the accompanying drawings, in which:

Figure 1 is a front elevation of the apparatus. Fig. 2 a view showing the internal mechanism of the said apparatus. Fig. 3 is a detail. Fig. 4 a plan on the line $x$—$x$, of Fig. 2, and Fig. 5 a transverse section taken partly on the line $y$—$y$ of Fig. 2. Figs. 6 and 7 illustrate punched and severed tickets of different values or fare units delivered by the apparatus, and having the time of delivery indicated thereon.

The roll or web $a$, of material to form the tickets, is mounted on a spindle $a^1$, fixed in a casing $b$ designed to be carried by means of a strap in the usual way, by the conductor or attendant, and to inclose the mechanism for feeding, punching, printing, and severing a ticket. The punching mechanism comprises a spring-controlled plunger $c$ engaging with a lever $c^1$, which is pivotally mounted on a shaft $c^2$, and is furnished with a punch $c^3$. The plunger $c$, also operates to feed forward the material $a$ prior to punching a hole therein, and with this object the lever $c^1$ is connected to a rack $c^4$, which is in engagement with a pinion $d^1$ (Fig. 4) on the spindle $d^2$. On this spindle is also mounted a disk $d^5$, carrying two pawls $d^4$, which are controlled by springs $d^6$. These pawls act on an internally toothed wheel $d^7$ integral with the feed-roller $d^3$, and thus, on the depression of the plunger $f^2$, the movement of the rack $c^4$, causes the rotation of the spindle $d^2$, and also through the intermediary of the pawls $d^4$, $d^4$, and the toothed wheel $d^7$ of the roller $d^3$. The lever $c^1$ is also connected to a counter $e$, of any well known type, which registers the total number of holes punched, these corresponding to the fare units. Instead of a straight rack $c^4$ a toothed quadrant may, however, be employed.

For printing the date and the time of issue on the ticket, there is provided a lever $f$, which is pivotally mounted upon the shaft $c^2$, and which is adapted to be brought to bear upon a plate $f^1$ carrying type for imprinting the hours. This plate $f^1$, in its turn, bears upon a date-stamp $f^4$, which is mounted upon a spring-plate $f^5$ attached to a plate $f^6$. This plate is secured to the casing $b$, by a fly-nut $f^7$, whereby the plate $f^6$ may be removed, together with the type (for imprinting the date), for the purpose of changing the type to the current date. Above the lever $f$, is mounted a clock $g$, the minute arbor $g^1$ of which is extended beyond the back of the clock casing and terminates in an extensible spindle $g^2$, consisting preferably of a helical spring which is connected to a stamp or block $g^3$ for imprinting the minutes upon the ticket. This spindle $g^1$ also operates a wheel train $g^4$ which drives a sleeve $g^5$, connected, by means of a similar extensible shaft $g^6$, to another stamp or block $g^7$ for imprinting the hours upon the ticket. Beneath the type, passes an ink ribbon $h$, the opposite ends of which are connected to rollers $h^1$, $h^1$, respectively mounted on opposite sides of the casing $b$, and projecting beyond the latter to enable the rollers $h^1$, $h^1$, to be rotated by hand for the purpose of advancing the ink-ribbon when the ink supply is exhausted. Below this ribbon $h$, is a plate $j$ which supports the paper strip, and which is furnished with a rubber pad whereon the type strike. The lever $f$ is operated by a plunger $f^2$, and is furnished with a cutter $f^3$ for severing the length of paper, to form a ticket, after it has been punched and printed. The plunger $f^2$ is also connected to the rack $c^4$, and when depressed feeds forward a greater length of paper than when the plunger $c$, pertaining to the punch $c^3$, is depressed; the object being to provide sufficient paper for receiving the printed impression of the date and the time, prior to severing a ticket.

Fig. 3, which is a part section taken through the center of the plunger $f^2$ in Fig. 2, shows the relative disposition of the punching lever $c^1$, the rack $c^4$, the printing and severing lever $f$, and the plunger $f^2$. From this arrangement it will be seen that when the punching plunger $c$ is depressed, it acts on the punching lever $c^1$ which, in its turn, by means of a spring $c^5$, carrying a pin $c^6$ in engagement with the rack $c^4$, depresses also the said rack $c^4$ to feed forward the roll or web of paper. Upon a sufficient length of paper being fed forward, the spring $c^5$ comes into contact with an abutment $c^7$ (Fig. 2), fixed to the casing $b$, so stopping the feed; the spring $c^5$, however, permits the plunger $c$ to be further depressed, with the effect that the punch $c^3$, mounted upon the lever $c^1$, perforates the paper roll. Also, it will be seen that when the severing and printing plunger $f^2$ is, in its turn, depressed, being rigidly attached to the rack $c^4$, it also causes a forward feed of the paper roll, and after such forward feed has taken place, a projection $f^x$ on the plunger $f^2$, comes into engagement with the printing and severing lever $f$, which, as described, actuates the cutter $f^3$, and the time-printing mechanism.

Figs. 6 and 7 illustrate tickets of one and three fare units respectively, and it will be observed that the ticket having one fare unit punched therein, is of shorter length than the ticket having three fare units punched therein; thus for every fare unit to be provided, the lever $c$ must be depressed the corresponding number of times, and by this means the tickets are caused to vary in length proportionately to the amount of the fare paid.

In the apparatus illustrated, a fare unit of one denomination only is given by way of example; but where an apparatus is required for fare units of various denominations a separate punch and a corresponding plunger for each denomination would be provided; and to distinguish the several denominations the punches would be of different shapes or sizes. There would also be provided, for each plunger, a counter, of any ordinary type, operated by each plunger separately. A bell, or bells, or a sounder of any suitable kind, may also be provided within the casing, and be operated by the plunger, or plungers, as the case may be, pertaining to the punch, or punches. Where several denominations are employed the bells or sounders would be of different tones.

The vertical plungers $c$ and $f^2$, hereinbefore referred to, may be replaced by levers arranged to project through one side of the apparatus.

Having now described my invention what I claim and desire to secure by Letters Patent, is:

1. In an apparatus of the class specified, the combination, with a reel having a continuous strip wound thereon; of a feeding mechanism; a primary mechanism for actuating said feed mechanism, to impart an initial feed movement to the strip; means actuated by said primary mechanism for perforating said strip; a secondary mechanism for actuating said feed mechanism, to impart a feed movement to the strip subsequent to the termination of the first movement thereof; and means actuated by the secondary mechanism for severing said strip.

2. In an apparatus of the class specified, the combination, with a strip-feeding device; of a primary operating member connected with said device for imparting an initial movement to the strip; means actuated by said member for perforating the strip; a secondary operating member connected with said device for completing the feed movement of said strip after the first movement thereof has been terminated; and means actuated by the secondary member for severing the strip.

3. In an apparatus of the class specified, the combination, with a strip-feeding device; of a primary operating member connected with said device for imparting an initial movement to the strip; means actuated by said member for perforating the strip; a secondary operating member connected with said device for completing the feed movement of said strip after the first movement thereof has been terminated; and means actuated by the secondary member for printing data upon the strip.

4. In an apparatus of the class specified, the combination, with a strip-feeding device; of a primary operating member connected with said device for imparting an initial movement to the strip; means actuated by said member for perforating the strip; a secondary operating member connected with said device for completing the feed movement of said strip after the first movement thereof has been terminated; means actuated by the secondary member for printing data upon the strip; and additional means actuated by said secondary member for ultimately severing the perforated and printed strip.

5. In an apparatus of the class specified, the combination, with a strip-feeding device; of a plunger operatively connected therewith for imparting an initial movement to the strip; means actuated by the plunger for perforating the strip; a second plunger operatively connected with said device for imparting a subsequent movement to the strip; and means actuated by the second plunger for severing the perforated strip.

6. In a portable ticket issuing apparatus, the combination, with a casing and a strip-feeding device located therein; of a manually-operated member connected with said device for imparting an initial movement to the strip; a second manually-operated member connected with said device for imparting a subsequent movement to the strip after the first movement thereof has been terminated; means actuated by each of said members for marking the strip; and additional means actuated by the second member for ultimately severing the marked strip.

7. In an apparatus of the class specified, the combination of a strip-feeding device; primary operating means connected with said device for imparting an initial movement to the strip; secondary operating means connected with said device for imparting a subsequent movement to said strip after the termination of the first movement thereof; means actuated by each of said operating means for marking the strip; and means actuated by the secondary operating means for ultimately severing the marked strip.

8. In an apparatus of the class specified, the combination of a strip-feeding device; a primary operating lever connected thereto; means for actuating said lever; a perforating device carried by said lever; a counter actuated by said lever for registering the number of perforations; a secondary operating lever connected to said feeding device; means actuated thereby for printing data on the perforated strip; and means for operating said secondary lever.

9. In an apparatus of the class specified, the combination of a strip-feeding device; a primary operating lever connected thereto; means for actuating said lever; a perforating device carried by said lever; a secondary operating lever connected to said feeding device; means actuated by the secondary lever for printing data upon the perforated strip; means carried by said secondary lever for ultimately severing the perforated and printed strip.

10. In an apparatus of the class specified, the combination of a strip-feeding device; operating means connected therewith for imparting an initial feed movement to the strip; means for perforating the strip; means for imparting a separate feed movement to the strip after the termination of the first movement thereof; means for subsequently printing data upon the perforated strip; and means for ultimately severing the perforated and printed strip.

11. In an apparatus of the class specified, the combination with a strip-feeding roller, and a pair of coöperating toothed elements for actuating the same; of a pair of operating members connected to one of said toothed elements; strip-perforating means actuated by one of said members; and strip-severing means actuated by the other member.

In witness whereof, I have hereunto signed my name in the presence of two subscribing witnesses.

WALTER CLIFFORD.

Witnesses:
A. J. WHETTEM,
JOHN WHETTEM.